United States Patent

[11] 3,580,193

| [72] | Inventors | Robert P. Logan<br>West Redding;<br>Orris E. Albertson, Norwalk, Conn. |
|---|---|---|
| [21] | Appl. No. | 855,633 |
| [22] | Filed | Sept. 5, 1969 |
| [45] | Patented | May 25, 1971 |
| [73] | Assignee | Dorr-Oliver Incorporated<br>Stamford, Conn. |

[54] HEAT TREATED WASTE SLUDGE DISPOSAL
20 Claims, 3 Drawing Figs.

[52] U.S. Cl. ........................................... 110/8
[51] Int. Cl. ........................................... F23g 7/00
[50] Field of Search................................ 110/7, 8;
71/12; 210/10, 63

[56] References Cited
UNITED STATES PATENTS

| 3,251,398 | 5/1966 | Greenfield.................. | 71/12X |
| 3,323,575 | 6/1967 | Greenfield.................. | 71/12X |
| 3,351,030 | 11/1967 | Albertson et al. ............ | 110/7 |
| 3,507,788 | 4/1970 | Cole et al..................... | 210/63 |

*Primary Examiner*—Kenneth W. Sprague
*Attorneys*—Burtsell J. Kearns and T. M. Jablon ABSTRACT: Sewage sludge is pressure cooked by heat exchange to 350—400° F. at a pressure sufficient to prevent evaporation for approximately 30 minutes to free bound cell water. The freed water is decanted and the remaining sludge is dewatered by centrifuge or filter to a very dry cake having a solids content of 35 to 75 percent. The cake is continuously fed to a fluidized bed combustion chamber for autogenous combustion wherein the sludge is reduced to inert burned exhaust gases and finely divided ash entrained with the gases. The dry cake readily crumbles into small pieces and may be screw fed or milled and blown into the combustion chamber. The high solids content, crumbly nature and nonordorous character of the cake simplifies feeding requires no auxiliary fuel after start up, or preheating of combustion air and decreases the size and capital cost of the combustion reactor.

INVENTORS.
ROBERT P. LOGAN
ORRIS E. ALBERTSON
BY George S. Hastings
ATTORNEY.

ROBERT P. LOGAN
ORRIS E. ALBERTSON
INVENTORS.

HEAT TREATED WASTE SLUDGE DISPOSAL

GENERAL NATURE AND OBJECTS OF THE INVENTION

This invention relates to disposing by combustion of sewage or other waste sludges, by first heat treating the sludge at an elevated temperature and pressure for an extended period of time as generally disclosed in British Pats. 1,129,362 and 1,129,361 to William E. Farrer Limited. This treatment results in a sludge which may be mechanically dewatered to a cake having a much higher solids content and which is must more friable and easily handled that conventionally thickened and mechanically dewatered sludge.

By combining the foregoing pretreatment of sludge with means by which the sludge is fed continuously to dewatering means such as a solid bowl centrifuge or a rotary filter and with continuous feed to a fluid bed combustion chamber an extremely compact and efficient thermal disposal system results. This system requires minimum space, no preheating of combustion air, and requires during normal operation no auxiliary fuel.

The product of the sludge pressure cooked as set forth in British 1,129,361 after mechanical dewatering is unlike other dewatered sludges which are plastic and cohesive. This pressure cooked sludge after mechanical dewatering is of a dry friable nature substantially free from odor which readily crumbles into small pieces which are especially suited to extremely rapid and substantially complete combustion in a fluidized bed of inert granular material. Such material may despite its high solids content be fed by a screw feed, and due to its crumbly nature may be also broken up into small pieces and blown into the combustion chamber. An object of the invention is to provide a combined pressure cooking and combustion system which takes full advantage of the unusual qualities of the resulting dewatered cake.

SLUDGE THICKENING AND HEAT TREATMENT

Figure 1:
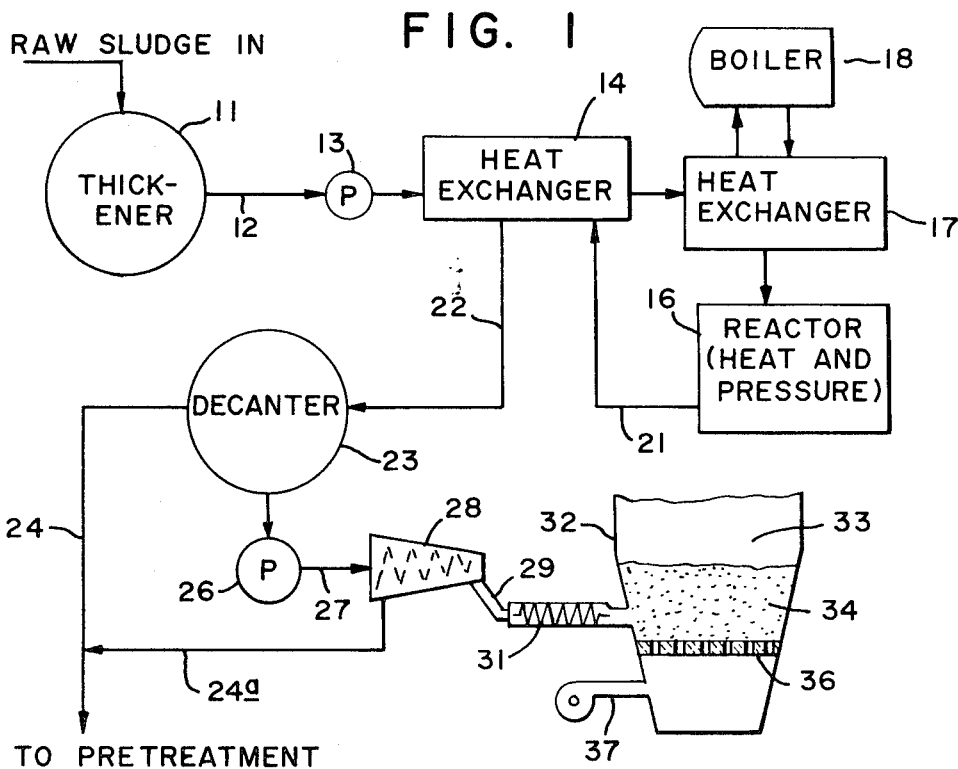
FIG. 1 is a general diagrammatic plan view of a system embodying the invention.

Referring to FIG. 1 the thickened sludge is fed from a thickener 11 through conduit 12 and pump 13 which feeds the sludge under pressure to a heat exchanger 14. Since a doubling of the solids content of the sludge without further significant change doubles the capacity of the sludge pressure cooking system, it is important that a highly thickened sludge be obtained such as supplied by the thickening process disclosed in the U.S. Pat. to Torpey No. 2,850,449 in which a solids content from 5 to 10 percent or over is secured. This process is characterized by controlling the operation of a clarifier having an upper body of liquor for effluent and a lower bed of sludge in which (a) the ratio of sludge volume in the bed compared with the sludge withdrawn in a day is in the range between $\theta$ and 3, (b) the depth of the bed is maintained between 1 and 5 feet, (c) the dry weight of solids fed to the clarifier is between 4 and 40 pounds per square foot of sludge bed area, (d) the rate of feed is between 250 and 1,500 gallons per square foot of sludge bed area and (e) the dilution of the feed to the clarifier is between 1,000 and 6,000 parts of solids per million parts of liquid.

The heat exchanger 14 heats the thickened incoming sludge by heat exchange from the hot outgoing sludge coming from the reactor or pressure cooker 16. The sludge from the heat exchanger is raised in temperature in booster heat exchanger 17, heated by boiler 18 to between 300 and 450° F. preferably in the range of 360 to 400 for a period between 20 and 40 minutes preferably about 30 minutes at a corresponding pressure about 15 to 17 atmospheres sufficient to prevent evaporation.

From the reactor the sludge passes through conduit 21 to the heat exchanger 14 again where much of its heat is given up to the incoming sludge and the temperature is brought down to a temperature around 80 to 90° F. From the heat exchanger, through conduit 22 the sludge goes to a continuous settling and decanting tank and sludge reservoir 23, from the upper part of which relatively clear liquid freed by the pressure cooking from the biological cells of the sewage sludge is decanted as overflow and passes to pretreatment or clarification through conduit 24. The underflow sludge from the bottom of the decanting tank 23 is pumped by pump 26 through conduit 27 to a mechanical dewatering unit 28 preferably a solid long bowl centrifuge, though a conventional rotary drum filter may also be used.

The pressure cooking system process and apparatus herein employed is of the continuous feed type disclosed in the above British Pats. 1,129,362 and 1,129,361 to which reference is made for a more detailed description.

The cake which issues from the combined pressure cooking and dewatering unit is, from most sewage sludges, of an entirely different physical character from the cake resulting from treatment at room temperature and pressure. The sludge cake resulting from mechanically dewatering most thickened sewage sludges without heat treating results in a cohesive, plastic material having the consistency of thick semidry mud and a rather low solids content particularly as to secondary or mixed secondary and primary sludges, on the order of 15—25 percent. There has been much difficulty in feeding this cake, and after feeding it getting it distributed evenly in a fluid bed or other combustion chamber, particularly in larger installations, resulting in expensive and elaborate combined paddle feeds, pumps and screw feeds and a multiplication of feed points into the combustion chamber.

I have described the combination with continuous pressure cooking of sludge with the preferred process of the U.S. Pat. No. 2,850,449, for greatly increasing the capacity of the pressure cooker. Another method of securing the high degree of sludge thickening desired in this combination is by centrifuging the dilute sludge with a nozzle centrifuge of the type disclosed in U.S. Pat. No. 3,073,516 to Glasson Jan. 15, 1963 providing a solids bearing underflow and a liquid overflow.

SLUDGE DEWATERING

This pressure cooked sewage sludge, in contrast, after mechanical dewatering as by a solid bowl centrifuge, has a solids content of 35 to 50 percent or more readily permitting autogenous combustion, without preheating of combustion air as hitherto common when burning biologically treated sludges. Preheating is troublesome and expensive because of corrosion problems and thermal expansion, and the requirement of a constriction or support plate for the fluidized bed, consisting of refractory material because of the high wind box temperatures resulting from preheated combustion air. But the most striking characteristic of the cake resulting from heat treating most sewage sludges in accordance with the invention is the friable crumbly nature of the cake which renders it easily broken into small pieces, somewhat granular in structure, which greatly aids feeding, and permits a choice of feeding methods such as milling and air conveying or blowing to the combustion chamber or screw feeding, and which promotes distribution and even burning in the combustion chamber and is particularly advantageous when fed to a fluidized bed combustion system because of its rapid and substantially uniform dispersal in the fluidized bed. Also because of the greatly increased solids content, approximately double that of untreated sludge, much smaller combustion chambers are needed calling for fewer feed points and reducing capital costs of the thermal reactor.

This pressure cooked sludge has proved in tests to produce particularly favorable results as to high solids content and high recovery of solids when dewatered by a solid long bowl centrifuge such as the centrifuge put out by Dorr-Oliver Incorporated known by the Registered Trademark "MercoBowl."

The results of a series of "MercoBowl" centrifuge tests on sewage sludge pressure cooked as above described, conducted on a variety of primary and secondary sludges proved that:

1. The centrifuge will dewater all types of primary plus secondary sewage sludges to concentrations in excess of 40 percent total solids at high recoveries.
2. The capacity of the centrifuge is doubled by heat treating the sludge. This doubling the capacity of the centrifuge is partly due to the higher concentration of settled sludge achieved by heating, and by the elimination of slimes.
3. Chemical cost, if used to achieve high recoveries at high feed rates, would be only one-sixth that currently employed.
4. Solids concentration achieved from the pressure cooking and centrifuging of raw activated sludge will be sufficient to sustain autogenous conditions in the reactor; that is, will exceed 35 percent total solids on activated sludge and 40—50 percent total solids on mixtures of primary and activated sludge.

SLUDGE CAKE FEEDING AND COMBUSTION

As shown in FIG. 1, the mechanically dewatered sludge is continuously fed from the centrifuge 28 into a conduit 29 from which a screw feed 31 delivers the cake through the sidewall 32 of the combustion chamber 33 directly into the fluidized bed 34 of incandescent inert granular material such as sand resting on an air permeable constriction plate 36. A blower 37 delivers combustion air at approximately room temperature in a cold wind box 38 below the constriction plate at a space rate sufficient to fluidize the bed. Due to the highly mobile nature of the fluidized sand and its grinding effect on the readily crumbled material particles, distribution and burning are very rapid and substantially complete in the bed. Because the ash is finely divided and passes out through exhaust outlet 39 with the combustion gases to be removed by cyclone gas cleaner 41, there is no ash removal problem.

Figure 2:
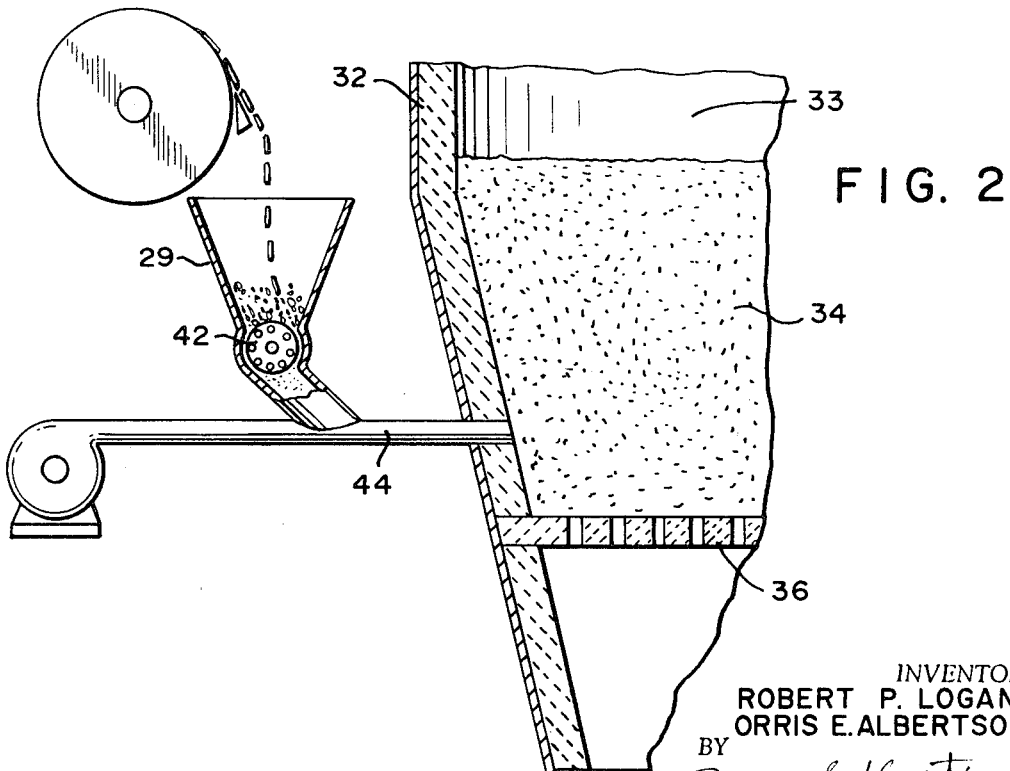
FIG. 2 is a view in elevation of the feed and part of the fluidized bed combustion chamber shown in section.

However, the nature of this pressure cooked sludge is such that it makes practical other methods of feeding. In FIG. 2, the dewatered sludge issuing from filter 40 to hopper 29 is milled by cage mill 42 into small pieces and delivered into the path of a stream of air from blower 43 in conduit 44 passing through the wall 32 of the combustion chamber to flow the sludge into the chamber.

Figure 3:
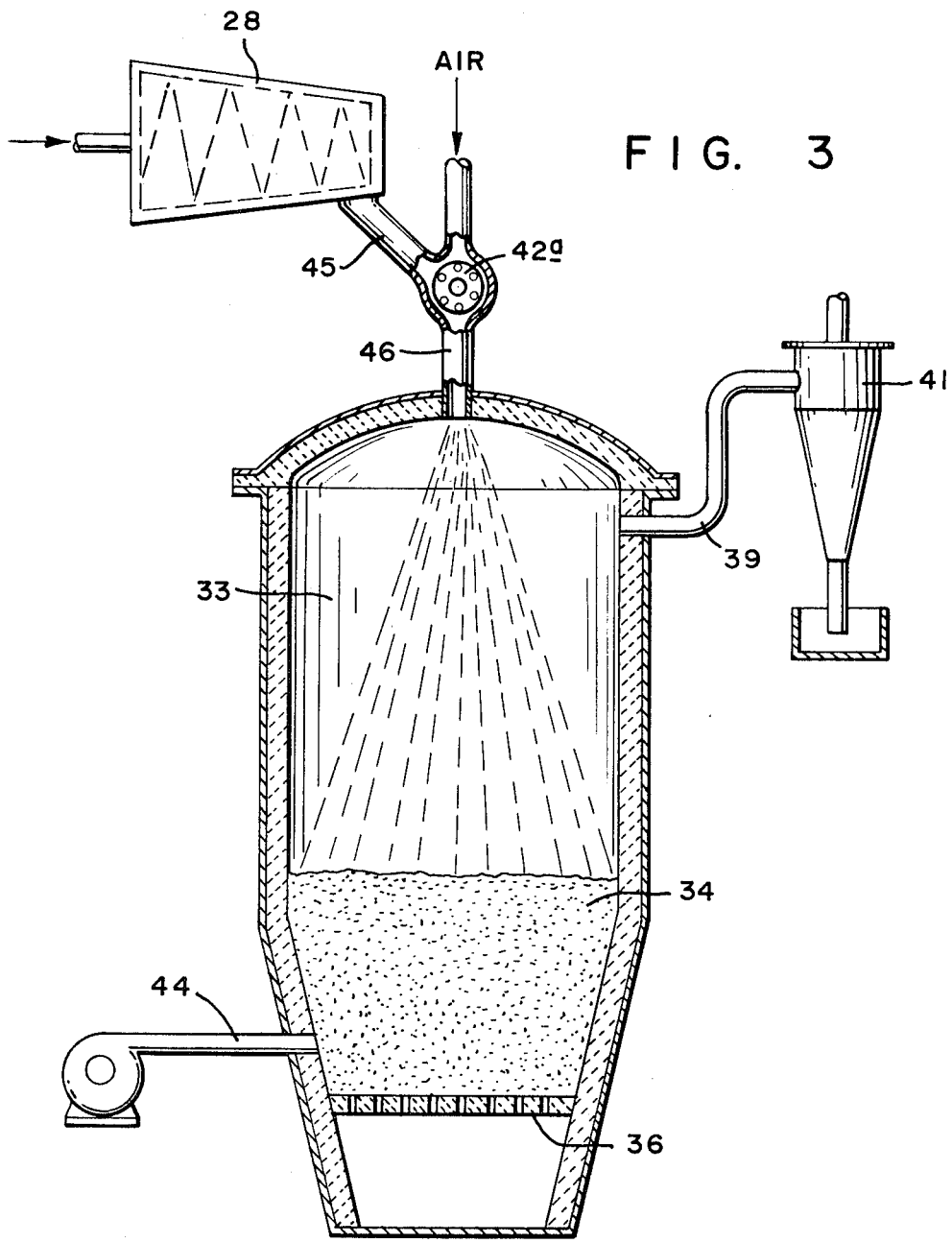
FIG. 3 is a view in elevation of a modified form of feed to the combustion chamber with the chamber shown in section.

In FIG. 3 centrifuge 28 delivers through chute 45 to cage mill 42 and blower 43 to delivering the heat treated sludge into a conduit 46 leading to the top of the combustion chamber to descend through the freeboard to the fluidized bed below. This takes advantage of the heat in the freeboard gases to further dry the particles as they descend to the fluidized bed for combustion in the bed.

Because the centrifuged and milled heat treated cake lends itself to feeding by blowing and because of its high solids content it is possible to feed and burn it in other types of combustion units, such for example, as that disclosed in U.S. Pat. No. 3,396,681 to Hubbard in which the dewatered sludge would be milled and blown by means such as shown in FIGS. 2 and 3 hereof through tube 14' and inlet opening 57 of FIG. 3 and 4 of the said patent.

It should be noted that each of the steps and apparatus employed in the foregoing embodiments of the invention from infeed of raw sludge to delivery of ash with exhaust gases is so arranged that the liquid or solids to be treated flow continuously in and out of each process step and piece of apparatus, resulting in continuous operation throughout.

While the invention has been illustrated and described in connection with a preferred embodiment and process, it is understood that the scope of the invention is to be defined by the following claims.

We claim:

1. Apparatus for disposing of sewage and other organic waste sludge by combustion, comprising in combination a reactor vessel having within it a horizontal air permeable partition dividing the vessel into a combustion chamber above having an exhaust outlet and a wind box below, a body of inert granular material at combustion temperature on said partition in the lower portion of the chamber with a freeboard above it, a blower supplying combustion air at substantially room temperature to said wind box at a space velocity sufficient to fluidize said body, a continuously operating centrifuge or filter-type mechanical dewaterer, a continuous through put pressure cooker operative to heat sludge passing through it to a temperature substantially above boiling, at a pressure above atmospheric sufficient to avoid evaporation, for a period in combination with said temperature and pressure sufficient to free cell bound water in the sludge, a decanter for decanting at last part of the freed water, means for supplying thickened sludge and continuously feeding it under said pressure through the cooker during said period and to the decanter and for feeding the underflow sludge from the decanter to the dewaterer wherein a friable readily crumbled cake having a solids content of 35 to 75 percent is formed, and devices for feeding the cake from the dewaterer to said bed for rapid breaking up and dispersal in the bed, and for maintaining substantially autogenous combustion during normal operation of the dewatered sludge into inert combustion gases and entrained finely divided ash passing out through the exhaust outlet.

2. The invention defined in claim 1 in which said temperature is between 350° and 450° F., and said period of time is between 15 and 60 minutes.

3. The invention defined in claim 1 in which said devices include a screw feed arrangement to feed cake into the fluidized bed.

4. The invention defined in claim 1 in which said devices include a mill for breaking up the cake into small pieces, and blower means for blowing the milled cake into said chamber.

5. The invention defined in claim 4 in which said blower means is arranged to blow the milled cake downwardly into the freeboard of said chamber.

6. The invention defined in claim 2 in which said mechanical dewaterer consists of a solid long bowl centrifuge arranged to receive the cooked decanted sludge and deliver it to said screw feed.

7. Apparatus for disposing of sewage or other organic waste sludge by combustion, comprising in combination a combustion chamber having an exhaust outlet and an inlet for material to be burned, a continuously operating centrifuge or filter type mechanical dewaterer, a throughput-type pressure cooker operative to heat sludge passed through it to a temperature of approximately 350° to 400° F. under sufficient pressure to prevent evaporation and for a period of 15 to 45 minutes sufficient to free cellular bound water in the sludge, a decanter for decanting at last part of the freed water, means for supplying thickened sludge and continuously feeding it under said pressure through the cooker during said period and to the decanter, and for feeding the underflow sludge from the decanter to the dewaterer wherein a friable readily crumbled cake having a solids content of 35 to 75 percent is formed, a mill arranged to mill said cake into small pieces, and a blower arranged to blow the milled cake through said inlet into the combustion chamber for maintaining autogenous combustion of the dewatered sludge, with the inert combustion gases and entrained finely divided ash passing through the exhaust outlet.

8. A process for disposal of secondary or mixed primary and secondary sewage sludge comprising subjecting the sludge to a sedimentary thickening operation producing a sludge having a solids concentration of over 5 percent, continuously pumping the thickened sludge under pressure through a pressurized heating zone in which the sludge is subjected to temperatures between 300 and 450° F., at pressures sufficient to avoid evaporation for a period between 15 and 60 minutes to free the cell water, decanting free liquid from the heat treated sludge, continuously feeding the remaining sludge into a solid bowl centrifuge to form cake having a solids content of over 35 percent, establishing a body of hot inert granular material at combustion temperature blowing combustion air at substantially room temperature into the body to fluidize the same, and feeding the dewatered sludge cake to said bed to disperse, finely divide and autogenously burn the same.

9. The invention defined in claim 8 including the steps of breaking up the cake into granular form and blowing it into contact with the fluidized body.

10. The invention defined in claim 8 including the step of screw feeding the cake into the fluidized body.

11. The invention defined in claim 8 including the steps of milling the cake into small particles, and blowing the particles directly into the fluidized bed.

12. The invention defined in claim 8 including milling the cake into small particles and blowing the particles into the freeboard above the fluidized bed.

13. The method of dewatering secondary or mixed primary and secondary sewage containing substantial amounts of bound cellular water, which consists in the steps of thickening the sludge to a solids content of 5 percent or over, heating the sludge under a pressure sufficient to prevent substantial evaporation, for approximately 20 to 30 minutes at a temperature between 350 and 450° F. to free the cellular water, cooling the treated sludge to below boiling temperature at atmospheric pressure, decanting the freed water, and centrifuging the underflow slurry from decanting to a solids content of 40 percent or more.

14. The invention defined in claim 12 in which the centrifuging takes place in an elongated solid bowl centrifuge.

15. A process for disposing of sewage sludge at least in part biological in nature and containing cellular bound water comprising subjecting the sludge to a high degree of thickening by controlling the operation of a clarifier having an upper body of liquor for effluent and a lower bed of sludge in which (a) the ratio of sludge volume in the bed compared with the sludge withdrawn in a day is in the range between ¼ and 3, (b) the depth of the bed is maintained between 1 and 5 ft., (c) the dry weight of solids fed to the clarifier is between 4 and 40 pounds per square foot of sludge bed area, (d) the rate of feed is between 250 and 1,500 gallons per square foot of sludge bed area and (e) the dilution of the feed to the clarifier is between 1,000 and 6,000 parts of solids per million parts of liquid, continuously pumping the thickened sludge under pressure through a pressurized heating zone in which the sludge is subjected to temperatures substantially above boiling, at pressures sufficiently above atmospheric to avoid evaporation for period sufficient in combination with said temperature and pressure to free the cellular water, decanting free liquid from the heat treated sludge, mechanical dewatering the sludge from decanting to form cake having a solids content of over 35 percent, providing a combustion chamber and feeding the dewatered sludge cake to said chamber to autogenously burn the same.

16. The invention defined in claim 15 in which the mechanical dewatering comprises centrifuging.

17. The invention defined in claim 15 in which said temperature is between 350 and 425° F. and said time is between 20 and 40 minutes.

18. The invention according to claim 15 in which said chamber is provided with a body of fluidized inert granular material at sludge combustion temperature, and the dewatered sludge cake is fed to the fluidized body.

19. A process for disposal of dilute sewage sludge containing cellular bound water comprising subjecting the sludge to a thickening operation producing a solids concentration of over 5 percent, continuously pumping the thickened sludge through a pressurized heating zone having in which the sludge is subjected to temperatures between 300 and 450° F., at pressures sufficient to avoid evaporation for a period between 20 and 40 minutes to free the cellular bound water, separating the freed water from the sludge, and thereafter subjecting the sludge to mechanical dewatering to produce a sludge having a solids content of 35 percent or more, establishing a body of hot granular inert material, blowing combustion air through said body to fluidize the same, and feeding the pressure cooked dewatered sludge cake to said bed, to disperse, finely divide, and autogenously burn the same.

20. The invention according to claim 19 in which said thickening operation comprises centrifuging in a nozzle-type centrifuge to provide a thickened underflow.